United States Patent Office 3,309,406
Patented Mar. 14, 1967

3,309,406
1-t-BUTYLAMINO-3-PHENOXY-2-PROPANOLS
Wilhelm Kunz, Frohnkamp 17, and Haireddin Jacobi, Frohnkamp 13, both of Monheim, Rhineland, Germany; Conrad Koch, Pannenbackerstrasse 9, Dusseldorf-Urdenbach, Germany; and Raymond J. Geus, 409 Kennerly Road, Springfield, Pa. 19064
No Drawing. Filed Mar. 24, 1965, Ser. No. 442,476
9 Claims. (Cl. 260—570.7)

This invention relates to novel 1-t-butylamino-3-(substituted phenoxy)-2-propanols having useful pharmacodynamic activity. More specifically the compounds of this invention block beta adrenergic receptors and thus have anti-anginal and anti-arrhythmic utility.

The beta adrenergic blocking activity of the compounds of this invention is demonstrated by opposing the stimulating effect of adrenalin upon the heart as evidenced by inhibition of the increase in rate of contraction when isolated right auricles from rats are challenged with adrenalin. These compounds have a high degree of blocking activity without undesirable direct stimulation or cardiac depression by the compound itself.

The novel compounds of this invention are represented by the following general structural formula:

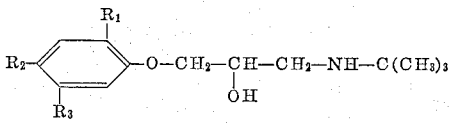

FORMULA I in which:
$R_1$ represents chlorine, bromine or lower alkyl of from 1 to 4 carbon atoms;
$R_2$ represents hydrogen, chlorine or bromine;
$R_3$ represents hydrogen or lower alkyl of from 1 to 4 carbon atoms; and
$R_1$ and $R_3$ are not both methyl, and $R_2$ and $R_3$ are not both hydrogen.

A preferred compound of this invention is 1-t-butylamino-3-(2-chloro-5-methylphenoxy)-2-propanol.

This invention also includes acid addition salts of the above defined amino compounds formed with nontoxic pharmaceutically acceptable organic and inorganic acids. Such salts are easily prepared by methods known to the art. Exemplary of organic salts are those formed with maleic, fumaric, benzoic, ascorbic, pamoic, succinic, methanesulfonic, ethanedisulfonic, cyclohexyl sulfamic, acetic and tartaric acids. Exemplary of inorganic salts are those formed with hydrochloric, hydrobromic, sulfuric and phosphoric acids.

The compounds of this invention are prepared by methods known to the art such as by reacting an appropriately substituted phenylglycidic ether or a phenoxy-2-hydroxy-3-halopropane with t-butylamine. Alternatively, an appropriately substituted phenol can be reacted with an aminopropylene oxide or an amino-3-halo-2-propanol. The phenylglycidic ethers are readily prepared by the reaction of an appropriately substituted phenol with epichlorohydrin. Methods of preparation are illustrated by the following examples which are not to be construed as limiting the scope of this invention.

Example 1

A mixture of 16.3 g. of (2-chloro-5-methylphenyl) glycidic ether and 6.2 g. of t-butylamine in 50 ml. of ethanol is heated at reflux for six hours. The solvent is removed, the residue is washed with water and then extracted with benzene. The dried extract is evaporated to give 1-t-butylamino-3-(2-chloro-5-methylphenoxy)-2-propanol.

Treatment of the free base in benzene solution with dry hydrogen chloride yields the hydrochloride salt.

Example 2

Similarly, following the procedure of Example 1 and employing equivalent amounts of the appropriately substituted phenyl glycidyl ether and t-butylamine the following compounds are prepared:

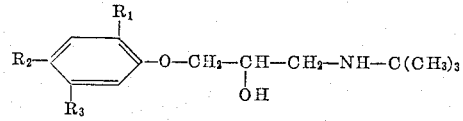

| $R_1$ | $R_2$ | $R_3$ |
|---|---|---|
| Br | Cl | H |
| Br | Br | H |
| $CH_3$ | Cl | H |
| t-Butyl | H | $CH_3$ |
| t-Butyl | Cl | $CH_3$ |

What is claimed is:
1. A chemical compound selected from the group consisting of a free base and its nontoxic salts formed with pharmaceutically acceptable acids, said free base having the structure:

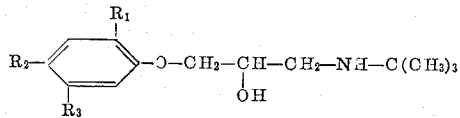

wherein:
$R_1$ is a member selected from the group consisting of chlorine, bromine and lower lakyl of from 1 to 4 carbon atoms;
$R_2$ is a member selected from the group consisting of hydrogen, chlorine and bromine;
$R_3$ is a member selected from the group consisting of hydrogen and lower alkyl of from 1 to 4 carbon atoms; and
$R_1$ and $R_3$ are not both methyl, and $R_2$ and $R_3$ are not both hydrogen.

2. A chemical compound of the formula:

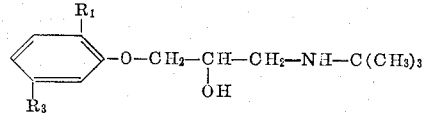

wherein $R_1$ is chlorine and $R_3$ is lower alkyl of from 1 to 4 carbon atoms.

3. A chemical compound of the formula:

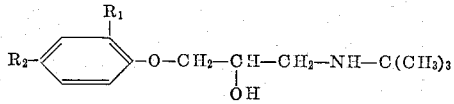

wherein $R_1$ is lower alkyl of from 1 to 4 carbon atoms and $R_2$ is chlorine.

4. 1 - t - butylamino-3-(2-chloro-5-methylphenoxy)-2-propanol.
5. 1 - t - butylamino-3-(2-bromo-4-chlorophenoxy)-2-propanol.
6. 1 - t - butylamino-3-(2-methyl-4-chlorophenoxy)-2-propanol.
7. 1 - t - butylamino-3-(2,4-dibromophenoxy)-2-propanol.

8. 1-t-butylamino-3-(2-t-butyl-5-methylphenoxy)-2-propanol.

9. A chemical compound selected from the group consisting of a free base and its nontoxic salts formed with pharmaceutically acceptable acids, said free base having the structure:

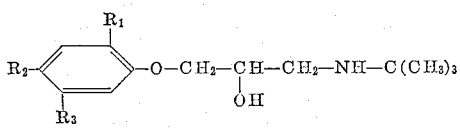

wherein $R_1$, $R_2$ and $R_3$ are a triad of substituents selected from the group consisting of (Cl, H, $CH_3$), (Br, Cl, H), (Br, Br, H), ($CH_3$, Cl, H), (t-butyl, H, $CH_3$) and (t-butyl, Cl, $CH_3$).

References Cited by the Examiner

UNITED STATES PATENTS 3,033,640  5/1962  Hofer et al. ___ 260—570.7 XR
3,203,992  8/1965  Kunz et al. _____ 260—570.7

FOREIGN PATENTS 622,297  4/1949  Great Britain.

OTHER REFERENCES

Beasley et al.: "Jour. Pharm. Pharmacol," vol. 10, pp. 47–59 (1958).

CHARLES B. PARKER, *Primary Examiner.*
JOSEPH P. BRUST, *Examiner.*
ROBERT V. HINES, *Assistant Examiner.*